United States Patent
Vovos et al.

(10) Patent No.: US 12,327,991 B2
(45) Date of Patent: Jun. 10, 2025

(54) AC BUSBAR FOR CURRENT SHARING BETWEEN PARALLELLY CONNECTED SEMICONDUCTOR SWITCHING PAIRS

(71) Applicant: BAE Systems Controls Inc., Endicott, NY (US)

(72) Inventors: Robert J. Vovos, Vestal, NY (US); Arthur P. Lyons, Maine, NY (US); Stephen L. Homan, Endicott, NY (US)

(73) Assignee: BAE Systems Controls Inc., Endicott, NY (US)

( * ) Notice: Subject to any disclaimer, the term of this patent is extended or adjusted under 35 U.S.C. 154(b) by 265 days.

(21) Appl. No.: 18/067,152

(22) Filed: Dec. 16, 2022

(65) Prior Publication Data

US 2024/0204501 A1  Jun. 20, 2024

(51) Int. Cl.
*H02G 5/02* (2006.01)
*H02M 7/00* (2006.01)

(52) U.S. Cl.
CPC .............. *H02G 5/02* (2013.01); *H02M 7/003* (2013.01)

(58) Field of Classification Search
CPC ................... H02M 7/003; H02G 5/02
See application file for complete search history.

(56) References Cited

U.S. PATENT DOCUMENTS

| | | | |
|---|---|---|---|
| 5,414,616 A * | 5/1995 | Hatozaki | H01L 25/072 257/E25.016 |
| 5,512,782 A | 4/1996 | Kobayashi | |
| 5,528,073 A * | 6/1996 | Gilmore | H01L 23/49575 257/E23.079 |
| 5,672,920 A | 9/1997 | Donegan et al. | |
| 5,777,377 A | 7/1998 | Gilmore | |
| 10,717,366 B1 | 7/2020 | Jaksic et al. | |

(Continued)

FOREIGN PATENT DOCUMENTS

| CN | 205829472 U | * 12/2016 |
|---|---|---|
| CN | 112928967 A | 6/2021 |

(Continued)

OTHER PUBLICATIONS

Yuxuan Wu, Mustafeez Ul-Hassan, Fang Luo; Busbar Design and Optimization for High Power Three-phase Inverter with WBG Device; 2022 IEEE 9th Workshop on Wide Badgap Power Devices & Applications, Nov. 9, 2022, pp. 132-137.*

(Continued)

*Primary Examiner* — Harry R Behm
(74) *Attorney, Agent, or Firm* — Scully Scott Murphy & Presser PC; Gary McFaline

(57) ABSTRACT

An AC busbar for connecting at least three phases from a semiconductor switching unit to a load is provided. The AC busbar parallelly connects the at least three phases and provides current balancing. The AC busbar has a terminal-side conductor mechanically connectable to each AC terminal of the semiconductor switching unit and a load-side conductor positioned between the terminal-side conductor and the load. A distance between the terminal-side conductor and the load-side conductor is such that a difference in an inductance between a connection point for a respective AC terminal of each phase and a common point on a middle of the load-side conductor is less than a predetermined percentage with respect to an average of the respective inductances.

15 Claims, 14 Drawing Sheets

(56) References Cited

U.S. PATENT DOCUMENTS

| | | |
|---|---|---|
| 10,951,128 B2 | 3/2021 | Usui |
| 10,985,669 B2 * | 4/2021 | Böhmer ................ H02M 7/48 |
| 11,183,440 B2 | 11/2021 | Lu et al. |
| 2012/0007535 A1 | 1/2012 | Jansson et al. |
| 2013/0058143 A1 | 3/2013 | Tachibana |
| 2013/0265808 A1 | 10/2013 | Ishii et al. |
| 2013/0279114 A1 | 10/2013 | Nishikimi et al. |
| 2013/0328458 A1 | 12/2013 | Crane |
| 2014/0077607 A1 | 3/2014 | Clarke et al. |
| 2014/0140119 A1 | 5/2014 | Shinohara et al. |
| 2014/0362627 A1 | 12/2014 | Sun et al. |
| 2015/0145462 A1 | 5/2015 | Ulrich et al. |
| 2016/0012938 A1 | 1/2016 | Bellancourt et al. |
| 2016/0094153 A1 | 3/2016 | Li et al. |
| 2016/0156278 A1 | 6/2016 | Ramm et al. |
| 2019/0149059 A1 | 5/2019 | Bohmer et al. |
| 2019/0157981 A1 | 5/2019 | Steinberger |
| 2020/0177101 A1 * | 6/2020 | Yamahira .......... H02M 7/53875 |
| 2021/0021204 A1 | 1/2021 | Lu |
| 2021/0313900 A1 | 10/2021 | Rosado et al. |
| 2021/0398875 A1 | 12/2021 | Lu et al. |
| 2022/0140614 A1 * | 5/2022 | Ough ..................... H02J 3/381 |
| | | 307/84 |

FOREIGN PATENT DOCUMENTS

| | | | |
|---|---|---|---|
| ES | 2804248 T3 * | 2/2021 | ............ H02J 3/381 |
| GB | 1040997 A | 9/1966 | |
| JP | 6-343269 A | 12/1994 | |
| JP | 2022085846 A * | 6/2022 | ............ H01R 13/02 |

OTHER PUBLICATIONS

International Search Report, PCT/US23/82455, mailed Apr. 4, 2024, 10 pages.

* cited by examiner

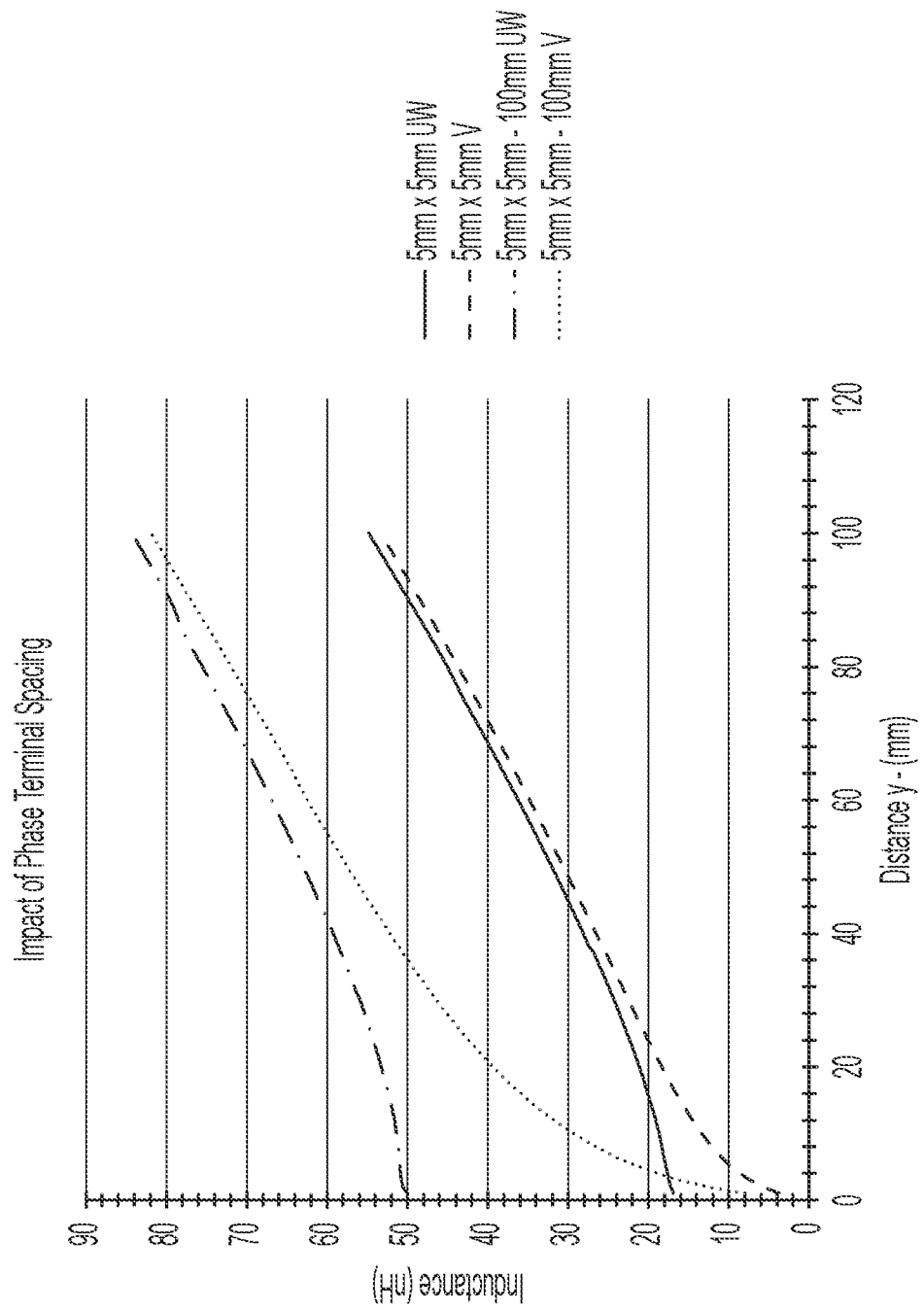

AC BUSBAR FOR CURRENT SHARING BETWEEN PARALLELLY CONNECTED SEMICONDUCTOR SWITCHING PAIRS

FIELD OF THE DISCLOSURE

This disclosure relates to busbar configurations and more particularly, an alternating current (AC) busbar for current sharing and balancing between parallelly connected semiconductor switches in a power conversion module such as an inverter module.

BACKGROUND

Inverters comprise a plurality of pairs of semiconductor switches. Each pair may be connected in a half bridge configuration between a positive bus (DC+) and a negative bus (DC−) (also known as HIGH and LOW). Each pair of semiconductor switches may be controlled to turn ON and OFF, causing square waves of voltage to be produced (output). Each pair of semiconductor switches may separately output a phase of power. Each phase may be supplied to an electric machine via busbars (AC busbars), e.g., separate busbars.

Alternatively, the outputs of each pair of semiconductor switches may be connected in parallel such that a single output is connected to the electric machine via an AC busbar from one inverter.

The square waves of voltage induce a current on the windings of the electric machine. Since the electric machine is electrically connected to the busbar, current flows within the busbar. Also, since each pair of semiconductor switches is electrically connected to the busbar, the pairs may be exposed to the current.

For high voltage applications, the current flowing within the busbar when paralleled may be high, such as greater than 800 A. Since the pairs of semiconductor switches are parallelly connected, the total current on the busbar is shared amongst the parallelly connected semiconductor switches. However, if the sharing between the different pairs of semiconductor switches is not substantially equally (substantially balanced), the pair(s) of semiconductors switches receiving a higher portion of the total current may be damaged and the current may exceed the rating. This impacts the performance of the inverter (and inverter module) and reduces reliability.

The configuration and arrangement of an AC busbar between terminals of the pairs of the semiconductor switches and the load, such as the electric machine, have an impact of the current sharing between the pairs of semiconductor switches. Certain known systems are configured such that the busbar(s) connecting the respective terminals to the load have equal current path lengths and reduce parasitic inductances in the busbars. For example, U.S. Pat. No. 5,777,377 describes using wide busbar plates and stacking them closely together (as close as possible) to reduce parasitic inductance, which increases the circuitry efficiency and reduces voltage transients. Additionally, the way the plates are disposed and arranged enables equal current path lengths.

However, equal current path lengths (physical path lengths) do not necessarily equate to current balancing and substantially equal currents among the parallelly connected semiconductor switching pairs. This may be due to unequal inductances between the different paths.

Inductance may be added between the output of the terminals of the respective pairs of semiconductor switches and the busbar to improve current sharing. However, adding inductance may increase the size of an inverter module, cost and reducing the module efficiency.

SUMMARY

Accordingly, disclosed is an AC busbar configured to connect at least three phases from a semiconductor switching unit to a load. Each phase has an AC terminal. The phases are connected in parallel by the AC busbar. The AC busbar comprises a terminal-side conductor, a load-side conductor, two connecting conductors and a conductor orthogonally projecting from the load-side conductor. The terminal-side conductor is mechanically connectable to each AC terminal of the semiconductor switching unit. The load-side conductor is positioned between the terminal-side conductor and the load. The load-side conductor may be parallel to the terminal-side conductor. The two connecting conductors connect the terminal-side conductor and the load-side conductor. The orthogonally projecting conductor is configured to be connected with the load. The orthogonally projecting conductor may be centered on the load-side conductor. A distance between the terminal-side conductor and the load-side conductor is such that a difference in an inductance between a connection point for a respective AC terminal of each phase and a common point on a middle of the load-side conductor is less than a predetermined percentage with respect to an average of the respective inductances.

In an aspect of the disclosure, the predetermined percentage is less than 10%. In an aspect of the disclosure, the predetermined percentage may be about 10%.

In an aspect of the disclosure, the terminal-side conductor, the load-side conductor and the two connecting conductors form a rectangular shape.

In an aspect of the disclosure, each connecting conductor is configured and dimensioned to be surrounded by a current sensor. In an aspect of the disclosure, each connecting conductor is configured for substantially the same current such as at least 450 A. In other aspects, the current may be less.

In an aspect of the disclosure, there are three-phases and three AC terminals, one per phase. The terminal-side conductor may have three corresponding openings to mount the AC busbar to the three AC terminals and vice versa.

In an aspect of the disclosure, the orthogonally projecting conductor is configured and dimensioned for a current of at least 900 A. In other aspects, the current may be less.

In an aspect of the disclosure, the orthogonally projecting conductor is aligned with the connection point for the central terminal of the three-phases.

In an aspect of the disclosure, a distance between the terminal-side conductor and the load-side conductor is greater than about 25 mm and less than about 40 mm.

In an aspect of the disclosure, the AC busbar may be formed from a single conductor. In other aspects, multiple conductors may be used. For example, the terminal-side conductor, the two connecting conductors, the load-side conductor and the conductor orthogonally projecting from the load-side conductor may be continuous and formed from a single conductor. In other aspects, the terminal-side conductor and the two connecting conductors may be formed from a single conductor where the remaining portion of the AC busbar may be formed from other conductors.

In an aspect of the disclosure, the inductance difference between the respective connection points and the common point may be less than about 2 nH.

In an aspect of the disclosure, the current difference between the terminals may be less than about 5% for a current of about 1000 hz.

Also disclosed is an AC busbar configured to connect at least three phases from a semiconductor switching unit to a load. Each phase has an AC terminal. The phases are connected in parallel by the AC busbar. The AC busbar comprises a terminal-side conductor, a load-side conductor, two connecting conductors and a conductor orthogonally projecting from the load-side conductor. The terminal-side conductor is mechanically connectable to each AC terminal of the semiconductor switching unit. The load-side conductor is positioned between the terminal-side conductor and the load. The two connecting conductors connect the terminal-side conductor and the load-side conductor. The orthogonally projecting conductor is configured to be connected with the load. The orthogonally projecting conductor may be centered on the load-side conductor. A distance between the terminal-side conductor and the load-side conductor is such that a difference in an inductance between a connection point for a respective AC terminal of each phase and a common point on a middle of the load-side conductor is less than a predetermined percentage with respect to an average of the respective inductance.

BRIEF DESCRIPTION OF THE DRAWINGS

FIGS. 3A-3D illustrate relationships between the distance between the load-side conductor and the terminal-side conductor and inductance between connection points for respective terminals and a common point in the middle of the load-side conductor based on different conditions in accordance with aspects of the disclosure, where FIG. 3A shows the impact of the cross-sectional area of the busbar on the inductance as a function of the distance between the load-side conductor and the terminal-side conductor; FIG. 3B shows the impact of the phase terminal spacing on the inductance as a function of the distance between the load-side conductor and the terminal-side conductor; FIG. 3C shows the impact of the number of phase terminals on the inductance as a function of the distance between the load-side conductor and the terminal-side conductor; and FIG. 3D shows a comparison of the inductance as a function of the distance between the load-side conductor and the terminal-side conductor for a busbar having a similar configuration as FIG. 5 and a busbar having a cross-sectional area of 5 mm×5 mm;

DETAILED DESCRIPTION

An AC busbar connects output terminals of a semiconductor switching unit to a load, such as an electric machine. The AC busbar described herein may be in an inverter module. The inverter module(s) may be one module of a modular power control system (MPCS). A MPCS is a modular line replaceable unit (LRU) containing a plurality of inverters modules and high voltage power distribution. The MPCS is scalable and customizable to have any number of inverters modules and current interfaces.

The MPCS may be installed in a vehicle such as a hybrid electric vehicle (HEV) or a battery electric vehicle (BEV). The vehicle may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, helicopter, UAV, and other powered air vehicles.

The semiconductor switching unit has a plurality of pairs of semiconductor switches. Each pair may be connected in a half bridge configuration between a positive bus (DC+) and a negative bus (DC−) to provide a voltage at an output terminal 70. Each semiconductor switch may be a transistor such as an Insulated-gate bipolar transistor (IGBT) or a metal oxide semiconductor field effect transistor (MOSFET). In some aspects of the disclosure, the semiconductor switch may be a wide bandgap semiconductor such as silicon carbide (SiC) or gallium nitride (GaN).

Figure 8:
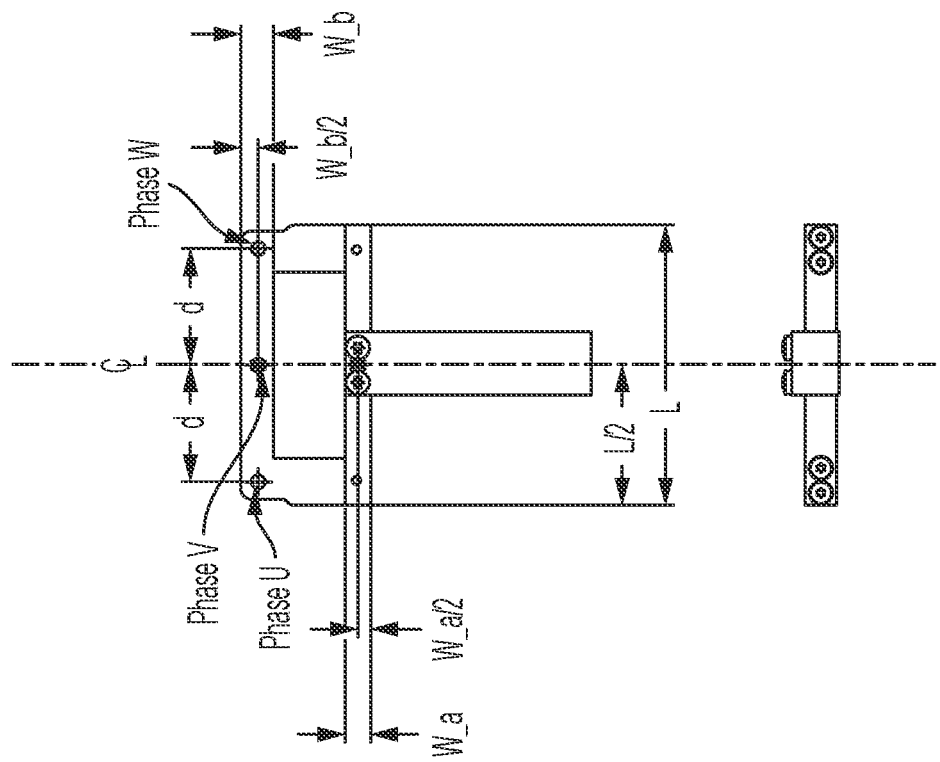
FIG. 8 illustrates another top view of an AC busbar in accordance with aspects of the disclosure illustrating the connection points for the respective phase terminals such as phase u, phase v and phase w and the common point in the middle of the load-side conductor.

The plurality of pairs of semiconductor switches may be arranged in a single package. The output terminals 70 may project or extend from the package. The AC busbar defines a physical distance between a connection point for a respective terminal and a common point in the middle of a load-side conductor. The connection points and the common point are illustrated in FIG. 8. In accordance with aspects of the disclosure, instead of having the physical distance between the connection points for respective terminals, respectively and common point in the middle of a load-side conductor being substantially the same for each terminal, the AC busbar has the inductance between the connection point for a respective terminal and the common point in the middle of a load-side conductor being substantially the same for each terminal, regardless of whether the physical distance is the same to have current balancing.

Figure 1A:
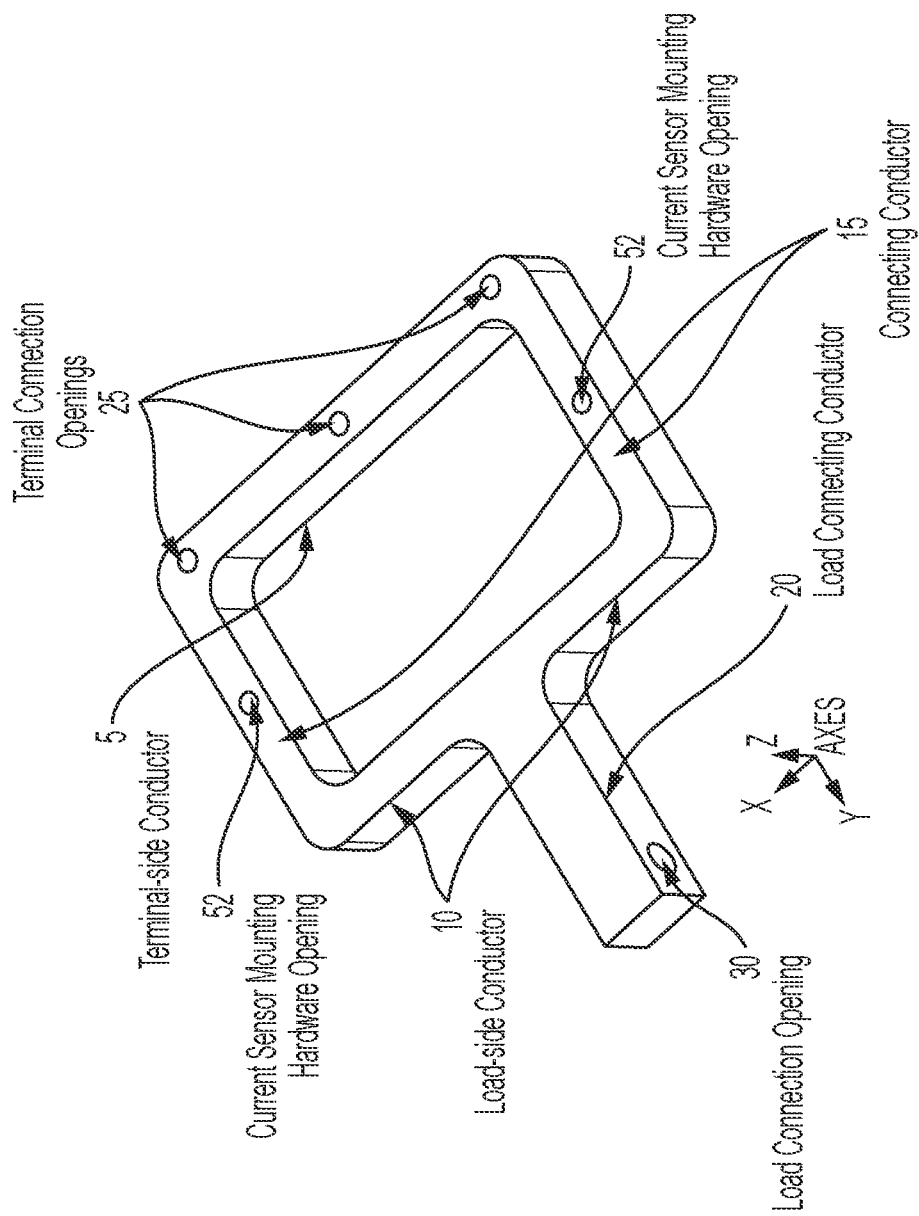
FIG. 1A illustrates an example of an AC busbar for current balancing of parallelly connected terminals of semiconductor switches in accordance with aspects of the disclosure.

FIG. 1A illustrates an example of an AC busbar in accordance with aspects of the disclosure. The AC busbar has a closed loop shape path from the terminal side to the load side and load connecting conductor projecting from the load side. The closed loop shape path may be substantially a rectangular shape with a gap between the sides of the rectangular shape such as shown in FIG. 1A.

The closed loop shape may be formed from a terminal-side conductor 5, two connecting conductors 15 and a load-side conductor 10. The load connects to the AC busbar via a load connecting conductor 20 which projects from the load-side conductor 10. The load connecting conductor 20 may have an opening 30 for connecting the load. For example, the load, e.g., an electric machine, may be connected to the AC busbar via a cable. The cable may have a ring terminal with a corresponding opening. The mounting hardware may be inserted into the load connection opening 30 and the corresponding opening in the ring terminal to electrically and mechanically connect the cable (and load). The load connecting conductor 20 is dimensioned for the total current flowing between the semiconductor switching unit and the load. The cross-sectional area of the load connecting conductor 20 may be larger than the cross-sectional area of the connecting conductors 15 depending on the material and the total current.

Figure 1B:
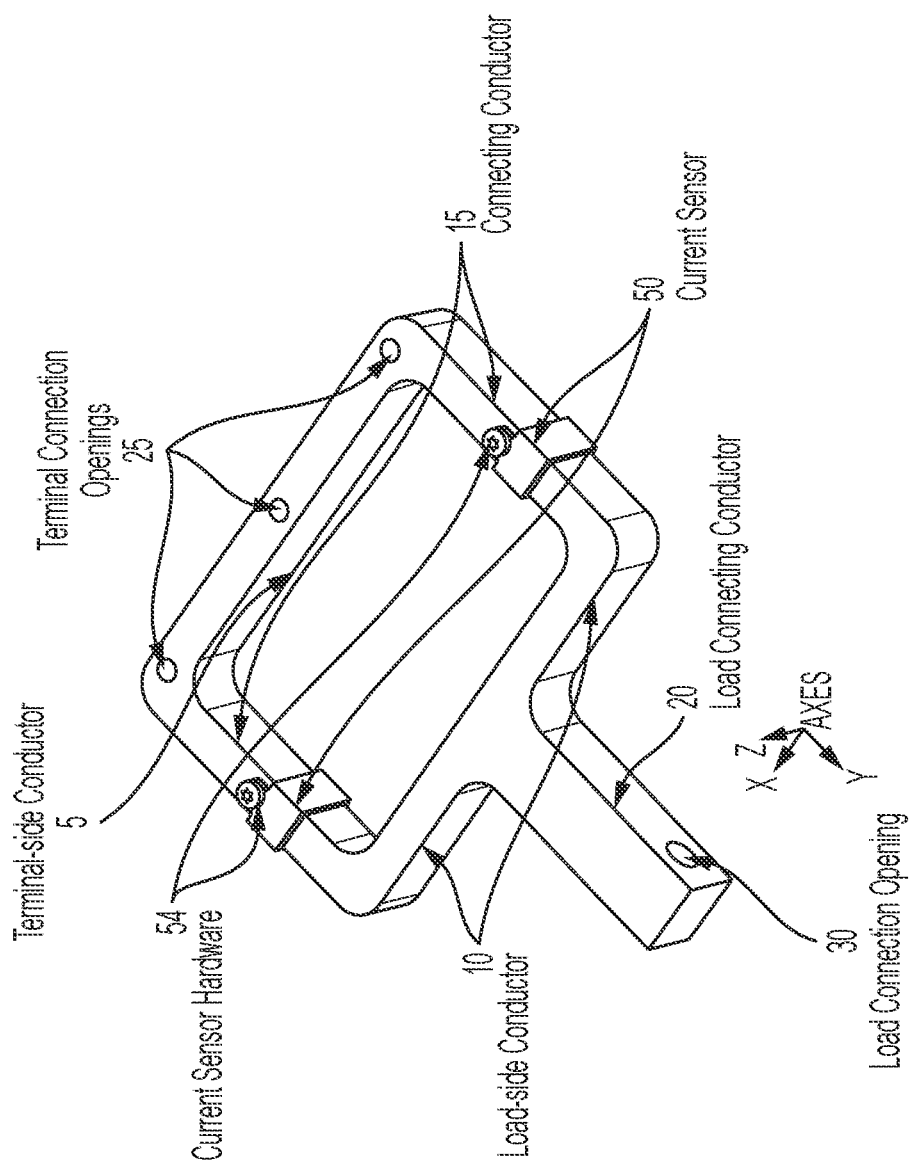
FIG. 1B illustrates the AC busbar of FIG. 1A with current sensors in accordance with aspects of the disclosure.

The connecting conductors 15 may have a respective opening 52 for current sensor mounting hardware to mount the current sensors 50 to the AC busbar. FIG. 1B illustrates an example of the current sensors 50 mounted to the AC busbar in accordance with aspects of the disclosure. The connecting conductors 15 may be dimensioned for about half of the total current flowing between the semiconductor switching unit and the load, based on the current balancing described herein. For example, the dimension may be based on a ½ the current +−10% (margin).

In aspect of the disclosure, the AC busbar may be formed from a single continuous conductor to form the terminal-side conductor 5, the two connecting conductors 15, the load-side conductor 10 and the load connecting conductor 20. In this aspect of the disclosure, each conductor 5, 10, 15, 20 may be made of the same conductive material. The conductive material may be a conductive material such as iron, lead, aluminum, gold, nichrome alloy, silver, graphene, tungsten, and copper. The material may be selected based on its conductivity and its skin depth.

Figure 1C:
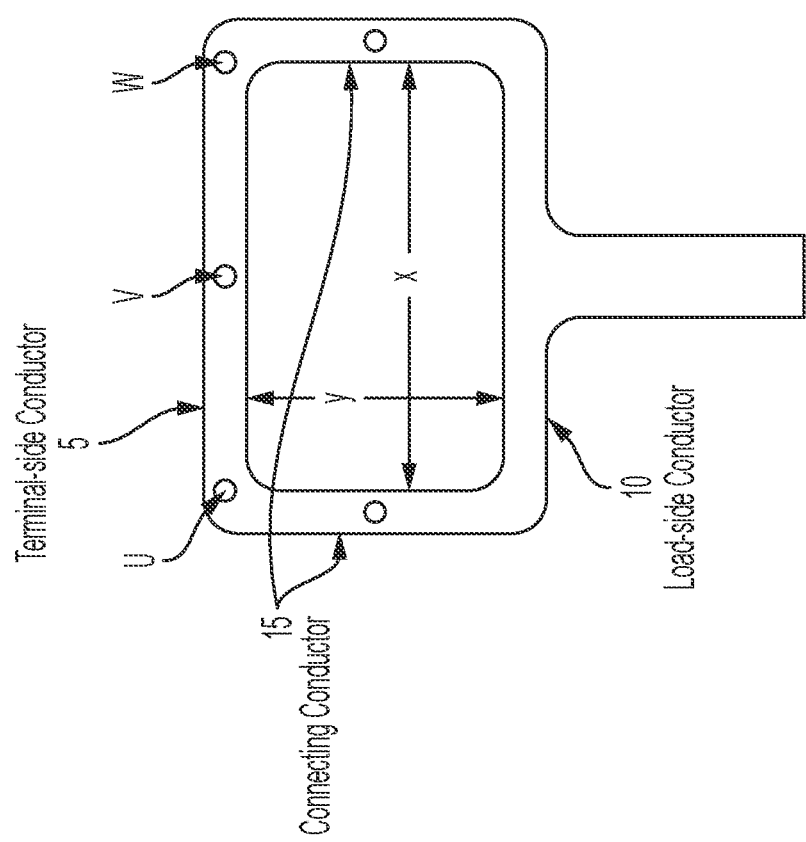
FIG. 1C illustrates a top view of the AC busbar of FIG. 1A illustrating the distances between pairs of sides of the AC busbar and an example of three of the phases in accordance with aspects of the disclosure.

The terminal-side conductor 5 is configured to mechanically and electrically connect to the switching unit output terminals 70. In some aspects of the disclosure, the terminal-side conductor 5 may having a plurality of openings 25 dimensioned to receive mounting hardware to mount the switching unit output terminals 70 to the AC busbar, respectively (and vice versa). In an aspect of the disclosure, the point of connection for the respective terminal may be the center of the mounting hardware, when the mounting hardware is inserted into the opening 25 and torqued down to make the electrical and mechanical connection. The mounting hardware may be further inserted into a nutplate (not shown) to fix the terminals 70 to the AC busbar. The number of openings may be based on the number of pairs of semiconductor switches in the semiconductor switching unit (switching package). For example, the semiconductor switching unit may comprise three pairs of semiconductor switches (six total semiconductor switches) and output three phases (identified herein as phase u, phase v, phase w or just "u," "v" and "w") such as illustrated in FIG. 1C. Three terminal connection openings 25 are shown in FIGS. 1A-1C for descriptive purposes. "v" may be a central terminal and the "u" and "w" may be end terminals, referring to the relative position of the terminals as illustrated in FIG. 1C.

Depending on the manufacturer of the semiconductor switching unit (switching package), the distance between adjacent output terminals may be the same in the x-direction and project in the y-direction by the same amount. For example, the distance d between adjacent output terminals may be about 50 mm.

Also depending on the manufacturer of the semiconductor switching unit (switching package), the height of the output terminals 70 in the z-direction may be the same. The output terminals 70 may be mounted on either the top of the terminal-side conductor 5 or the bottom of the terminal-side conductor 5 depending on the application including the size of the inverter module in which the AC busbar is installed and other circuitry within the inverter module.

In a case where the height output terminals 70 are different, the terminal-side conductor 5 may have one or more bosses or bushings projecting from the surface to facilitate the connection.

In an aspect of the disclosure, the length of the terminal-side conductor 5 may substantially the same as the distance between the end output terminals of the semiconductor switching unit (e.g., terminals for u and w) such as shown in FIG. 1A. The terminal-side conductor 5 may also be orthogonal to the terminals 70 and substantially straight.

Figure 2A:
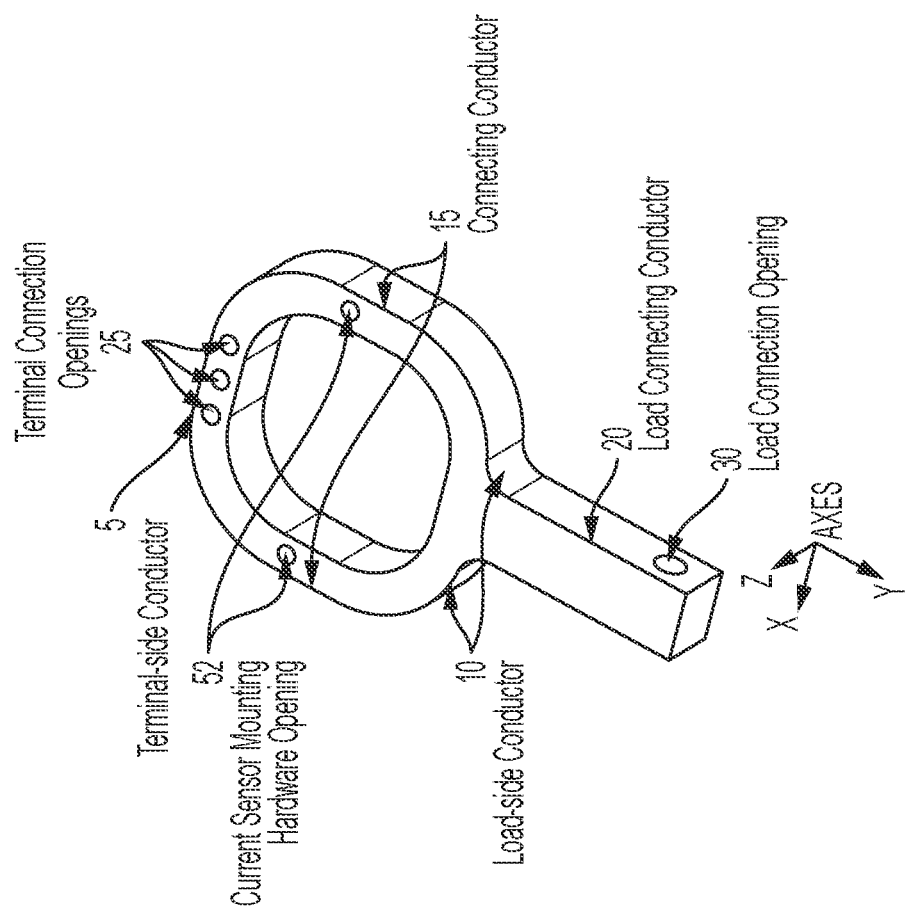
FIG. 2A illustrates another example of an AC busbar for current balancing of parallelly connected terminals of semiconductor switches in accordance with aspects of the disclosure.

However, in other aspects of the disclosure, the terminal-side conductor 5 may have an arc (such as shown in FIG. 2A). For example, in a case where the terminals of the switching unit 70 are not aligned, the terminal-side conductor 5 may be formed to match the relative position of the output terminals 70. In some aspects of the disclosure, each pair of semiconductor switches may be in a separate package, each with an output terminal 70 (connection tab). The packages may be positioned within an inverter module such that the output terminals 70 are substantially aligned. However, in other aspects, the packages may be positioned in the inverter module such that output terminals 70 are not substantially aligned.

In some aspects of the disclosure, the closed loop shape may differ depending on the alignment of the output terminals 70. For example, where aligned, the AC busbar may have the shape shown in FIG. 1A, however, where the output terminals 70 are not aligned, the AC busbar may be arced, and the close loop shape may have the shape as shown in FIG. 2A (another example of the AC busbar).

The load-side conductor 10 may be parallel to the terminal-side conductor 5 such as shown in FIG. 1A. In other aspects of the disclosure, the load-side conductor 10 may be substantially parallel to the terminal-side conductor 5.

In an aspect of the disclosure, the distance y, as illustrated in FIG. 1C between the load-side conductor 10 and the terminal-side conductor 5 is set based on the relative inductance between a connection point for the respective terminals and a common point on the middle of the load-side conductor. In accordance with aspects of the disclosure, the distance y determines the current balancing by the AC busbar. The distance y may be impacted by the current flowing in the AC busbar including frequency, the conductive material of the busbar, the thicknesses of the busbar including the connecting conductors 15, the closed loop shape and the distance d between adjacent terminals and the distance x between connecting conductors 15. The distance x is illustrated in FIG. 1C.

The current flowing in the terminal-side conductor 5 induces a magnetic field. Similarly, the current flowing in the load-side conductor 10 induces a magnetic field. At any given time, the magnetic field is opposite because the current flowing in the terminal-side conductor 5 and the load-side conductor flows in opposite directions. Depending on the distance y, these magnetic fields may cancel (coupling), reducing the inductance. Current flowing in the connecting conductors 15 also induce a magnetic field. The distance x between the connecting conductor 15 is such that the magnetic fields may not cancel. Given the relative positions of the phase, e.g., u, v, w (connection points for the respective terminals), the magnetic field caused by the connecting conductors 15 for the u/w phase may be higher than at the v phase (where v is in the middle between u/w). Thus, when the distance y is smaller, e.g., close to zero, most of the inductance in the paths between a connection point for the respective terminals 70 and the common point in the middle of the load-side conductor 10 is caused by the magnetic fields of the connecting conductor 15 (with the magnetic fields induced in the terminal-side conductor 5 and the load-side conductor 10 substantially canceling). Therefore, the inductance between the connection points for the u/w phase terminals and the common point in the middle of the load-side conductor 10 is much larger than the inductance between the connection point for the v phase terminal and the common point in the middle of the load-side conductor 10 is smaller distance y. However, as the distance y increases, the amount of canceling is reduced and the inductance between the connection point for the v phase terminal and the common point in the middle of the load-side conductor 10 may increase with a higher rate than the u/w phase terminals. This is because the physical length between the connection point for the v phase terminal and the common point in the middle of the load-side conductor 10 is longer than the connection points for the u/w phase terminals and the larger inductance due to the difference in length (longer path) dominates.

Figure 3A:
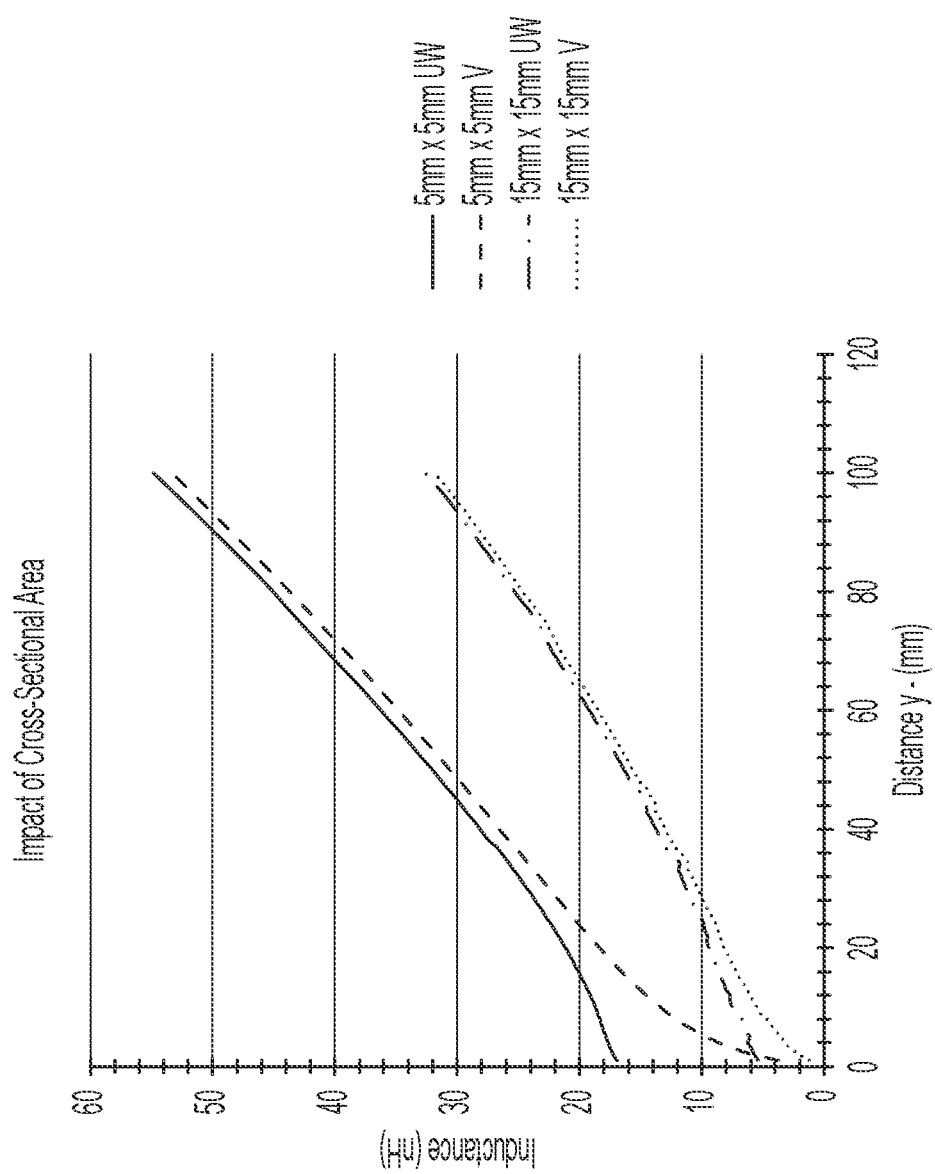

FIG. 3A illustrates the impact on the cross-sectional area of the AC busbar on the inductance between the connection points for the respective terminals and the common point in the middle of the load-side conductor 10 as a function of the distance y between the terminal-side conductor 5 and the load-side conductor 10. in accordance with aspects of the disclosure determined by finite element analysis.

In FIG. 3A, copper was used for the conductive material. The terminal-side conductor 5, the connecting conductors 15 and the load-side conductor 10 had a cross-sectional area of 15 mm×. 15 mm or 5 mm×5 mm as shown in the labelling. Each terminal connection opening 25 was modelled as a 15 mm×15 mm opening based on the size of the terminal (15 mm×15 mm) or 5 mm×5 mm for the smaller cross-sectional area busbar. The frequency of the current was 1 kHz. The distance d between adjacent terminals was about 50 mm.

As illustrated, the inductance between the connection point for each of the three phases and the common point in the middle of the load-side conductor 10 is higher for the busbar having the smaller cross-sectional area (in some distances approximately two times higher). Both sets of respective paths converge as the distance between the terminal-side conductor 5 and the load-side conductor 10 increases.

Increasing the distance y decreases the difference in the inductance between the different paths (u, v, w). Since u/w is substantially symmetric viz the AC busbar, the inductance is the same. While increasing the distance y provides better current balancing between the terminals 70, the increase in distance y increases the overall inductance and reduces the efficiency. However, since the AC busbar is connected to the load such as an electric machine that also has inductance, the amount of the reduction in efficiency is small since the inductance in the electric machine is orders of magnitude greater.

For the 15 mm×15 mm AC busbar, at a distance y=20, the difference between in inductance for the phases u/w v. v is about 1.5 nH. For the 5 mm×5 mm AC busbar, at a distance y=20, the difference between in inductance for the phases u/w v. v is about 3 nH.

FIG. 3B illustrates the impact of the phase terminal spacing on the inductance as a function of the distance between the terminal-side conductor 5 and the load-side conductor 10. The analysis used the above parameters. The cross-section of the conductors was maintained at 5 mm×5 mm, but the distance d between adjacent terminals 70 was doubled to about 100 mm. As can be seen in FIG. 3B, the change in the distance d dramatically increases the inductance for all paths and shifts the converges to the right, e.g., requiring a much larger distance between the terminal-side conductor 5 and the load-side conductor 10 for converging the inductance of the paths for u, v, w. For example, at a distance y=30 mm for the distance d=50 mm, the difference in inductance is less than 2 nH; however, when the distance d increases to 100 mm, the difference is greater than 5 nH.

Figure 3C:
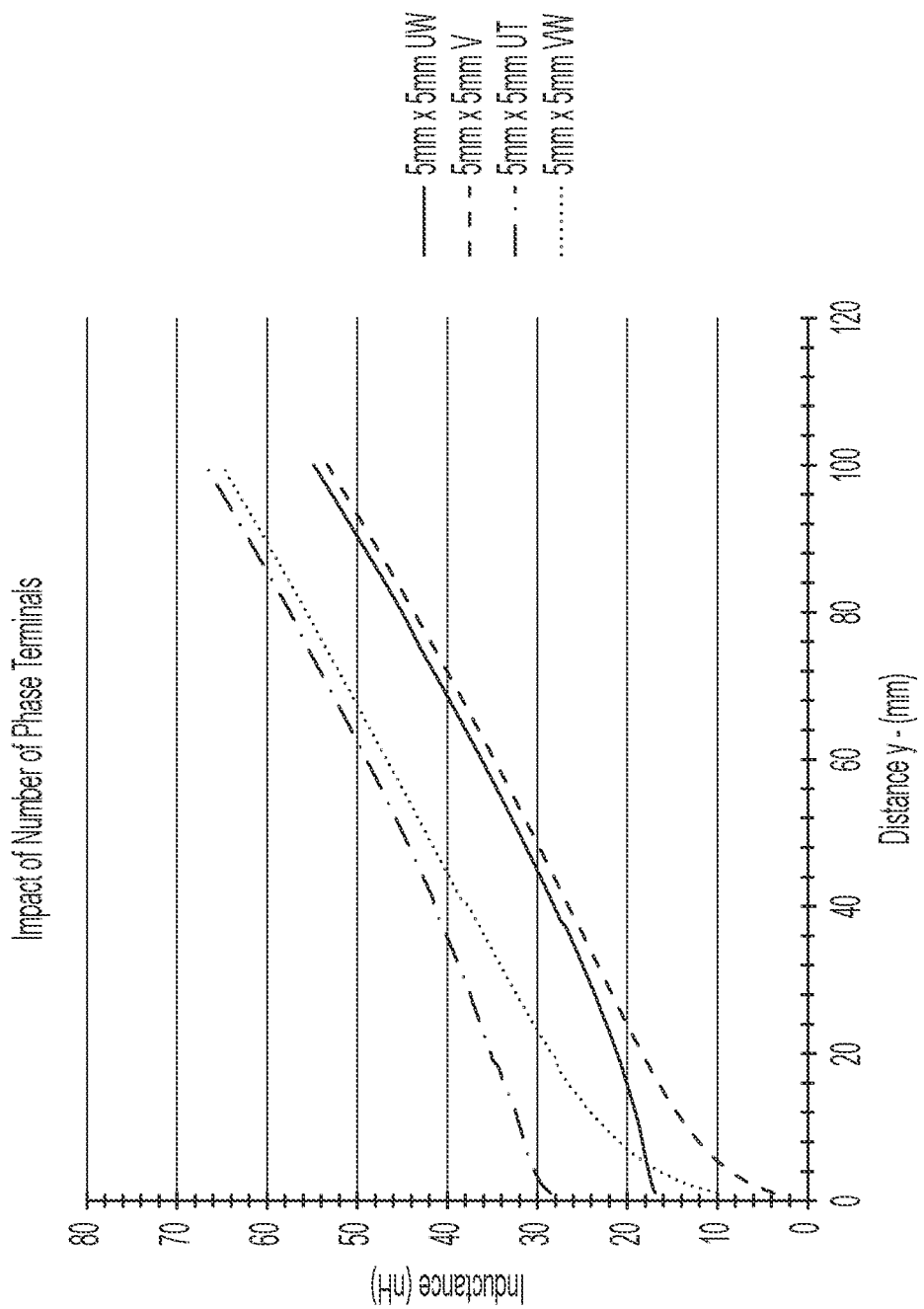

FIG. 3C illustrates the impact of the number of phase terminals 70 on the inductance as a function of the distance between the terminal-side conductor 5 and the load-side conductor 10. FIGS. 3A and 3B show relationships when there were three phase terminals, u, v, w (v being in the middle of u/w). In FIG. 3C, the cross-sectional area was 5 mm×. 5 mm. FIG. 3C shows the difference the inductance between the connection points for the respective phases and the common point on the load-side conductor 10 for three v. four phases (three v. four terminals). The spacing between each terminal 70 was the same d=50. v and w are the middle terminals of the four phase terminals and u and t are the end terminals. As illustrated, the middle terminals v, w in the four phase terminal arrangement follow a similar pattern as v in the three phase terminal system, where the inductance between the connection point for the v, w and the common point on the load-side conductor 10 at a distance y close to zero (where the terminal-side conductor 5 and load-side conductor 10), is low, but ramps up quickly and the inductance between the connection point for the u, t and the common point on the load-side conductor 10 at a distance y close to zero (where the terminal-side conductor 5 and load-side conductor 10), is higher but the rate of change is slower and converge. For most distances y, the inductance between the connection points of the respective terminals and the common point (in the four-phase terminal system) is higher than the three-phase terminal system at the same distance y between the terminal-side conductor 5 and the load-side conductor 10. The convergence point is also shifted to the right such that the distance y would be longer to achieve current balancing.

Figure 3D:
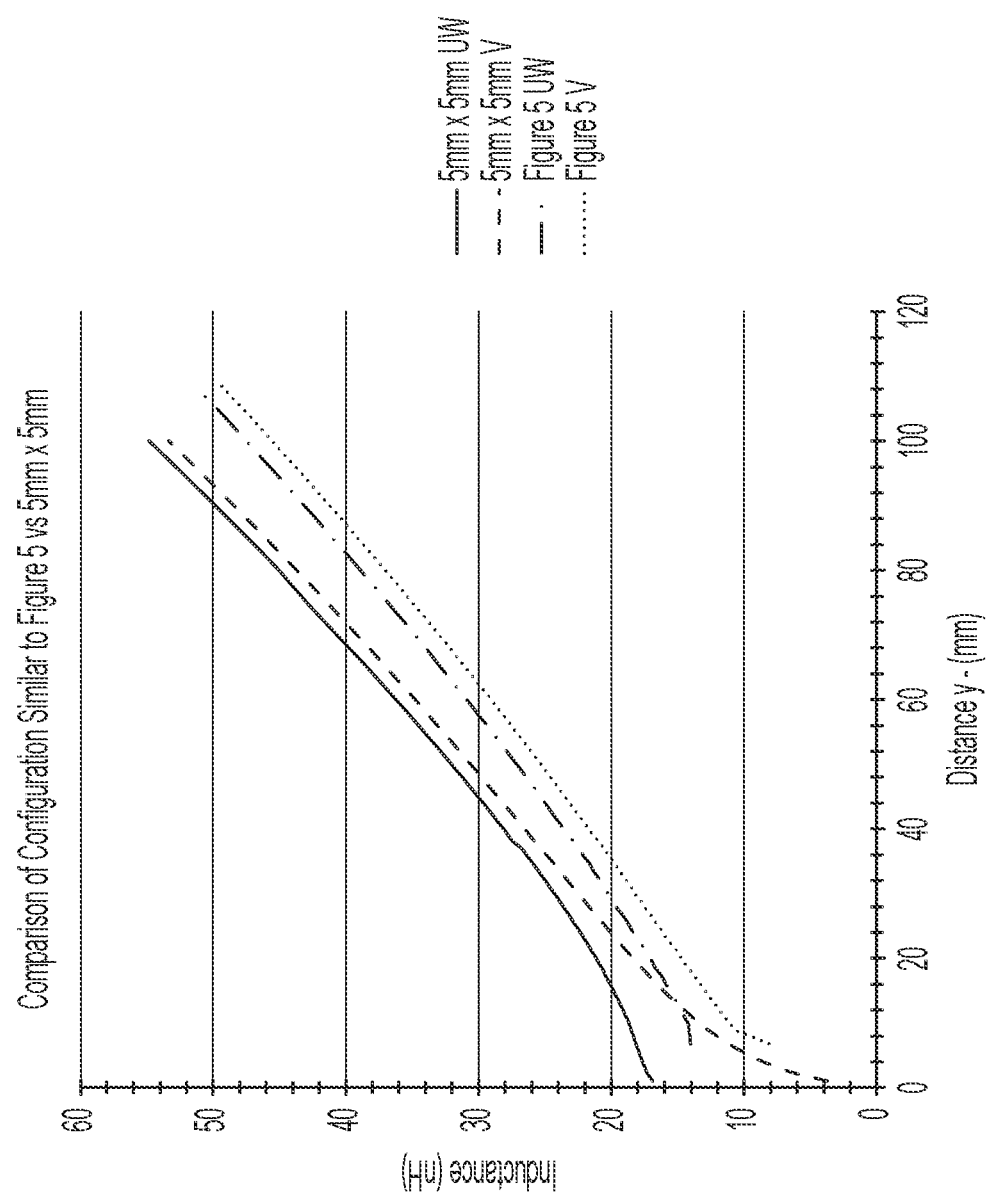
Figure 5:
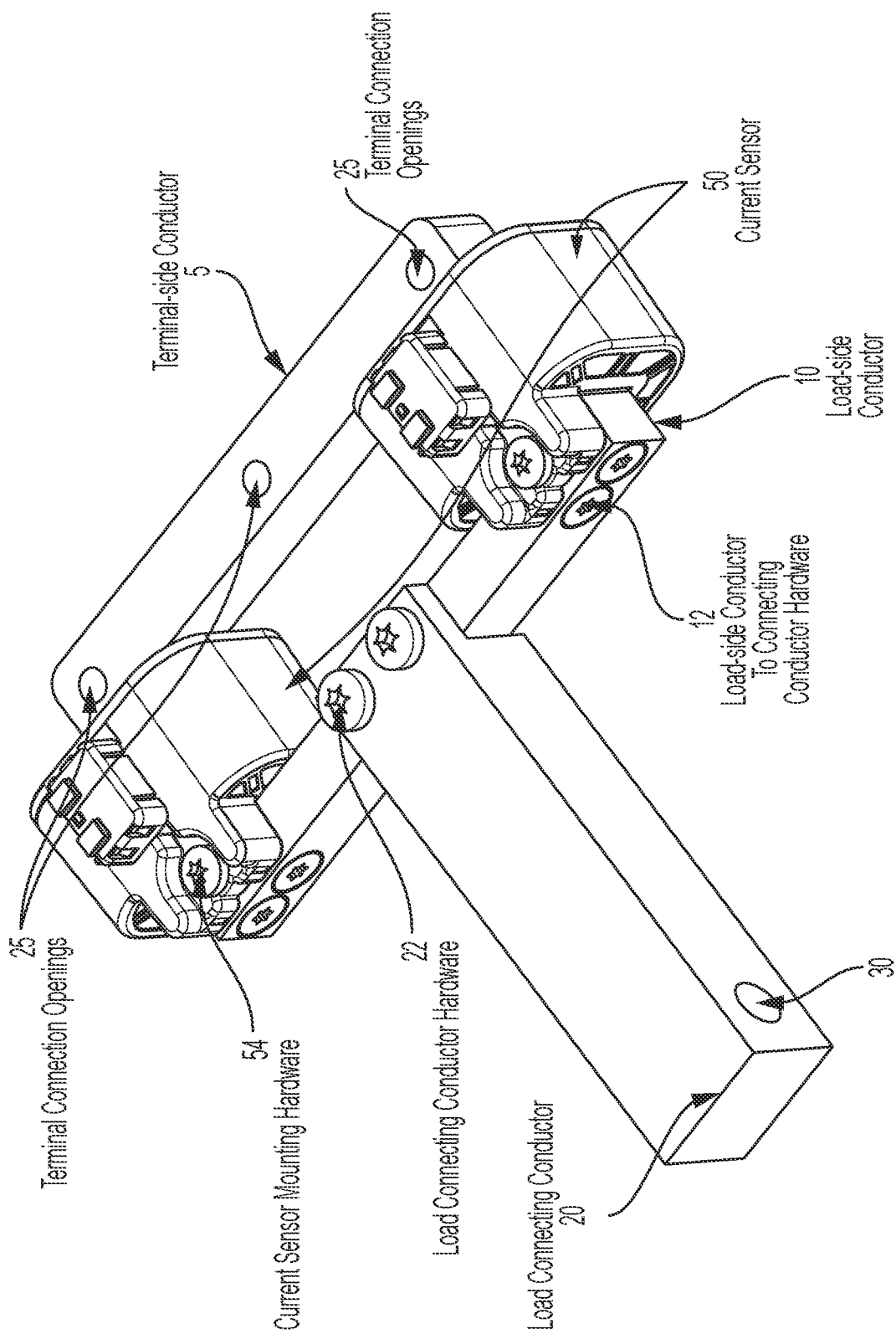
FIG. 5 illustrates a perspective view of the AC busbar of FIG. 4 in accordance with aspects of the disclosure.

FIG. 3D illustrates a comparison between the inductance between the connection points of the respective terminals and the common point on the middle of the load-side conductor 10 as a function of the distance for two busbars including a busbar similar to the busbar illustrated in FIG. 5 and the 5 mm×5 mm cross-sectional area busbar used in FIG. 3A. As illustrated, the busbar similar to illustrated in FIG. 5 has a lower inductance between the connection points of the respective terminals and the common point on the middle of the load-side conductor 10 for most distances y. The busbar used in FIG. 3D (similar to FIG. 5 had a larger cross-sectional area) than 5 mm×5 mm. Examples of the dimensions are described below. After a distance y about 26-28 mm, both inductances increase approximately linearly.

As described above, current sensors 50 may be mounted via an opening 52 on each of the connecting conductors 15. In an aspect of the disclosure, the current sensors 50 may be Hall effect current sensors. In a case where the AC busbar is a single piece conductor, the Hall effect current sensor may be a split core having a hinge enabling the connecting conductor(s) 15 to be inserted into the opening of the sensor(s) 50 by rotation of the sensor by the hinge and rotating the sensor to close to surround the connecting conductor 15. Once closed, the sensor 50 may be mounted by inserting the mounting hardware 54 into the opening 52. The mounting hardware 54 may be a bolt and a washer.

Figure 2B:
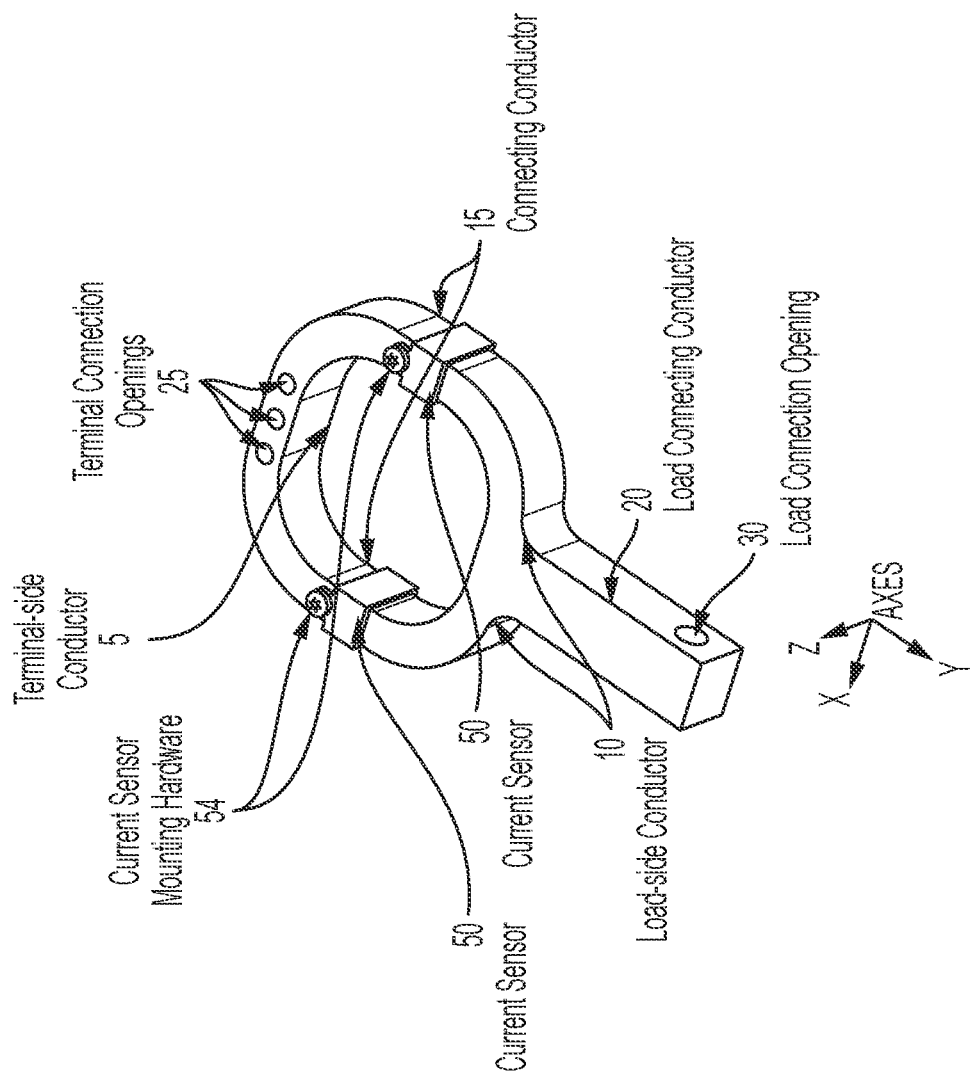
FIG. 2B illustrates the AC busbar of FIG. 2A with current sensors in accordance with aspects of the disclosure.

In an aspect of the disclosure, the distance y is large enough to facilitate the mounting of the sensor 50, e.g., minimum y is greater than the axial length of the sensor 50. Advantageously, the closed loop shape, such as shown in FIGS. 1B and 2B, enables current balancing sensing using only two sensors 50. In an aspect of the disclosure, since the distance y is set as described herein, the current sensed by the sensors 50 should be substantially equal based on the substantially equal inductance, e.g., convergence. For example, the difference in current may be less than 10%. In other aspects, the difference may be less than 5%.

In an aspect of the disclosure, if the difference between the sensed current by both current sensors 50 is greater than a threshold, the pairs of semiconductor switches may be controlled to short the LOW side semiconductor switches to protect the semiconductor switches from the current imbalance. In other aspects, the pairs of semiconductor switches may be controlled to open to protect the semiconductor switches from the current imbalance. The threshold may be application specific and based on the amount of the expected current in each path and the current rating of the semiconductor switches and capacitors on a DC bus within the inverter module.

Figure 4:
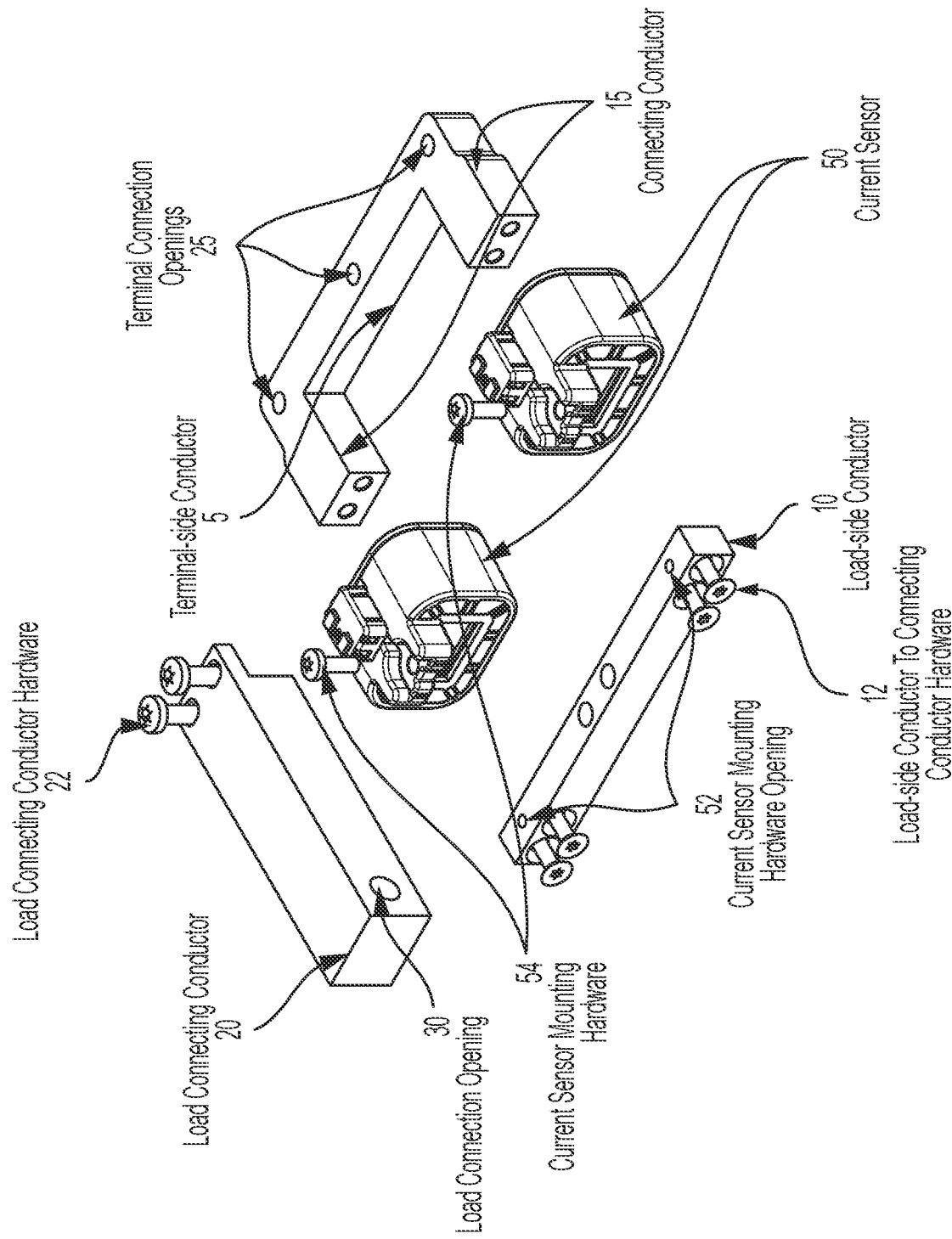
FIG. 4 illustrates an exploded view of another example of an AC busbar for current balancing of parallelly connected terminals of semiconductor switches and having current sensors in accordance with aspects of the disclosure.

FIG. 4 illustrates an exploded view of another AC busbar in accordance with aspects of the disclosure. The AC busbar illustrated in FIG. 4 comprises three separate conductors mounted to form the AC busbar. A single conductor is used for the terminal-side conductor 5 and the two connecting conductors 15. A second conductor is used for the load-side conductor 10 and a third conductor is used for the load connecting conductor 20. In an aspect of the disclosure, each conductor may be made of the same conductive material, for example, copper. However, in other aspects, any of the above-described conductive materials may be used.

As illustrated in FIG. 4, each connecting conductor 15 has a cross-sectional area complimentary to the opening of the sensor 50. This shape enables easy mounting and for maintaining good contact, e.g., high surface area in contact. Since the AC busbar illustrated in FIG. 4 has multiple conductors, the conductors are mounted together via openings and mounting hardware 12, 22. For example, the ends of the connecting conductors 15, respectively, having two mounting openings (not labeled) to receive hardware 12 to connect the load-side conductor 10 to the connecting conductor 15. The load-side conductor 10 has corresponding openings (not labeled).

The center of the load-side conductor 10 also has two openings (not labeled) for receiving hardware 22 to connect the load connecting conductor 20 to the load-side conductor 10. The openings may be equi-distance between the common point, e.g., the middle point of the load-side conductor.

The load connecting conductor 20 has corresponding openings. Thus, the load connecting conductor 20 is substantially aligned with the central terminal of the semiconductor switching unit, e.g., v phase, in the x-direction.

The diameter of each of the mounting openings for mounting the respective conductors may be the same size. The load connecting conductor 20 may have a notch (L-shape) such that the top (or bottom) of the load connecting conductor 20 sits on the top (or bottom) of the load-side conductor 10 and a respective side of the load connecting conductor 20 and the load-side connector 10 are in contact. In other aspects, depending on the current flowing in the AC busbar the load connecting conductor 20 may be connected to the load-side conductor in a similar manner as the connecting conductor 15.

Since there are additional openings in the AC busbar for mounting the three conductors together, the slopes of the curves in FIGS. 3A-3C and the convergence may be different because the current flow may be altered by the openings.

The current sensors 50 are secured to the AC busbar using mounting hardware 54 mounted through opening 52. In the example busbar illustrated in FIG. 4, the current sensor mounting hardware openings 52 are in the load-side conductor 10 instead of the connecting conductor 15 as described above.

FIG. 5 illustrates a perspective view of an assembled AC busbar of FIG. 4. As illustrated, the current sensors 50 surround the connecting conductor 15 (not labeled in FIG. 5). The distance y is substantially the same as the axial length of the sensor 50 as also shown in the partial sectional view of FIG. 6, however, there is a small gap between the sensor 50 and the terminal-side conductor 5 as illustrated in FIG. 6.

In accordance with aspects of the disclosure, an AC busbar may be installed an inverter module. The inverter module may comprise a DC bus with a capacitor bank (a plurality of capacitors), the semiconductor switching unit and the AC busbar. The DC bus, the semiconductor switching unit and AC busbar may be mounted within a chassis 60.

Figure 6:
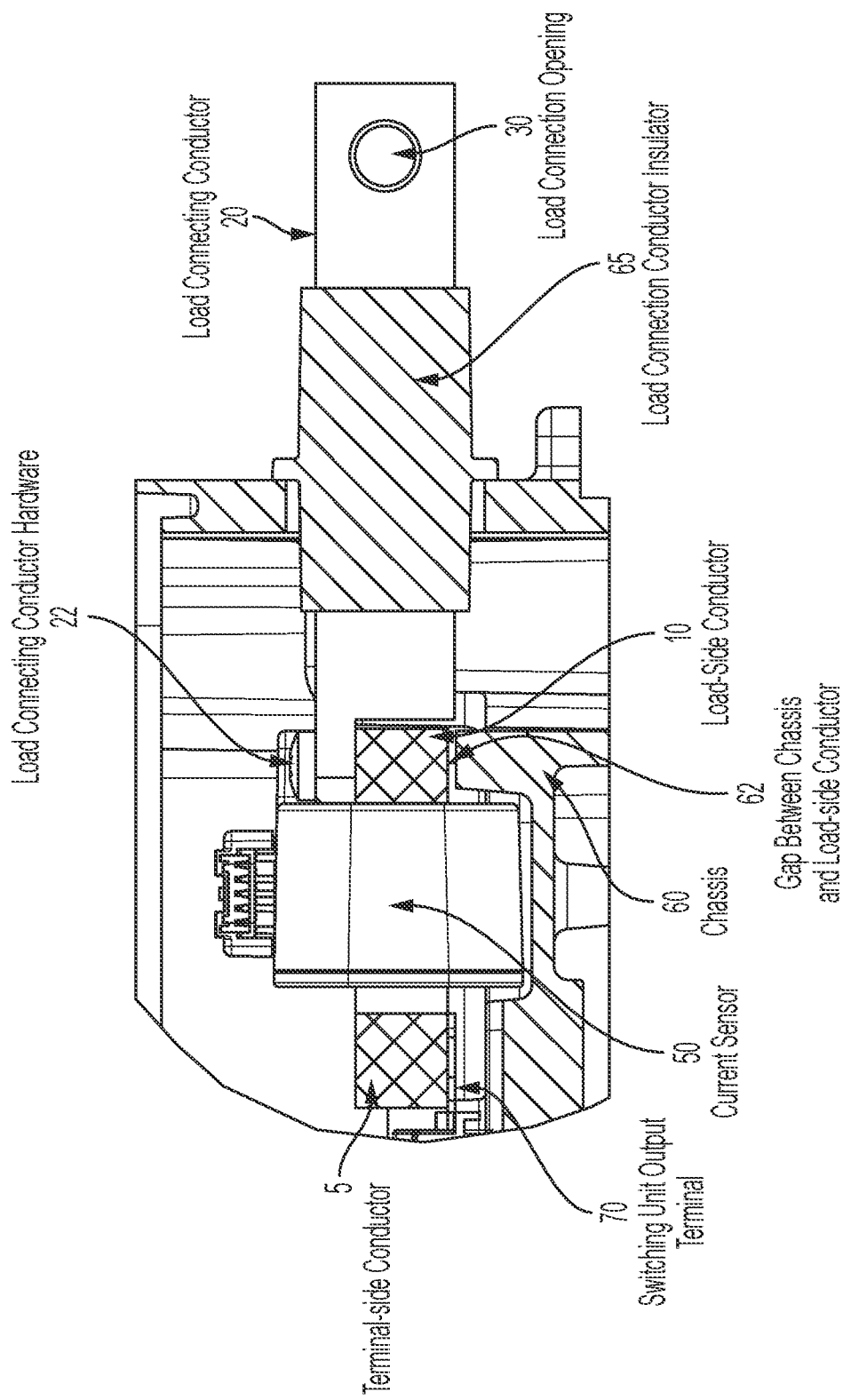
FIG. 6 illustrates a sectional view of the AC busbar illustrated in FIGS. 4 and 5 connected to the terminals of the semiconductor switching unit in a chassis of an inverter module in accordance with aspects of the disclosure.

As shown in FIG. 6, the chassis is positioned below and above the AC busbar. In an aspect of the disclosure, where there is a small gap between the chassis 60 and the AC busbar, insulation pads may be used to insulate the chassis 60 from the AC busbar. For example, in the gap 62 as shown in FIG. 6, an insulation pad may be inserted.

The distance y between the terminal-side conductor 5 and the load-side conductor 10 may also be limited by the chassis 60 end. In some aspects of the disclosure, there is a set gap between the chassis end and the load-side conductor 10. This gap allows for the load connecting conductor 20 which projects from the load-side conductor 10 to be partially within the chassis and protrude from the chassis 60 via an opening in the chassis. In some aspects, the distance may allow the gap between the chassis and the load-side conductor 10 (side thereof) not to have insulation.

Figure 7:
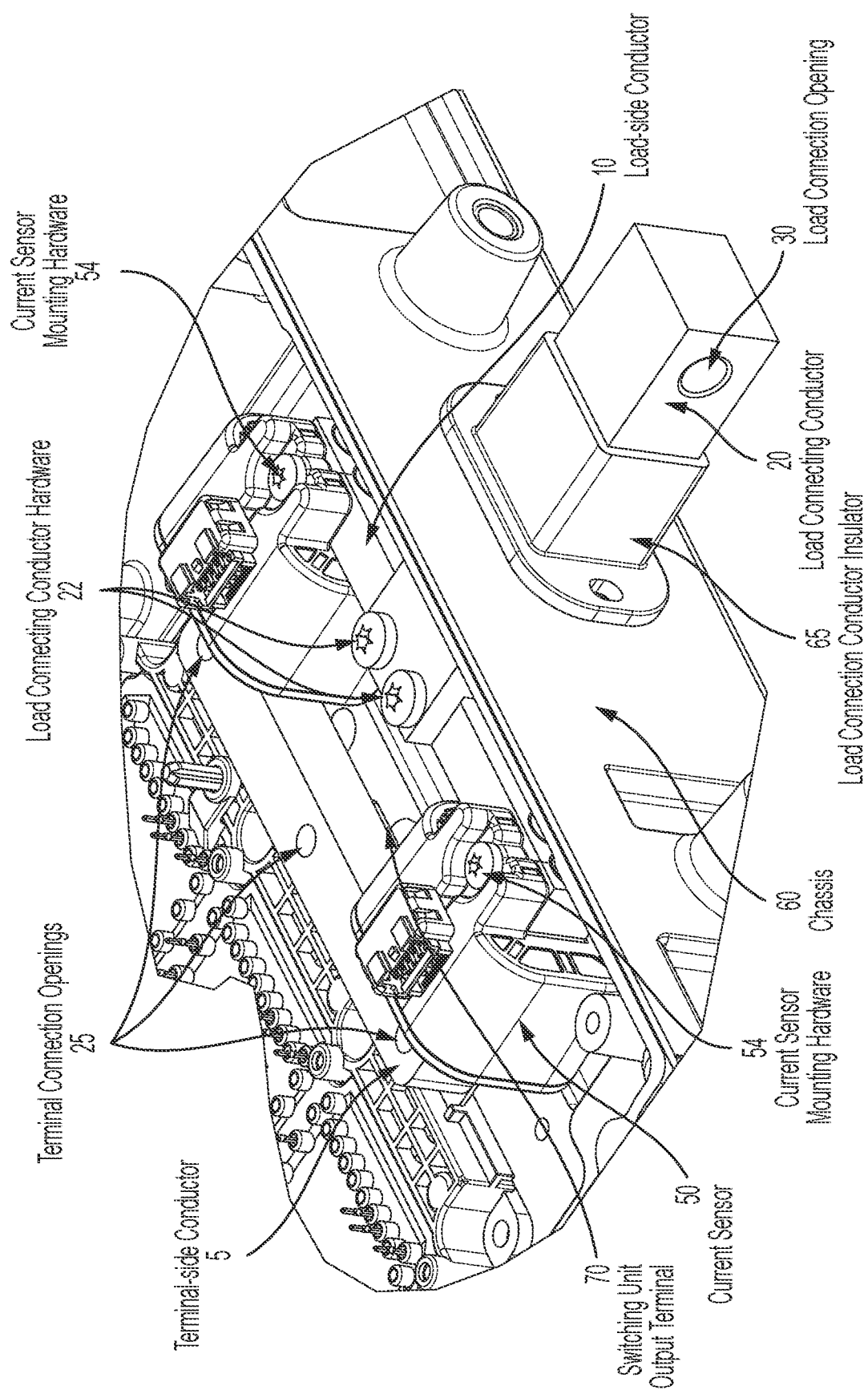
FIG. 7 illustrates a perspective view of a portion of the inverter module showing the AC busbar connected to the terminals of the semiconductor switching unit in the chassis of the inverter module and the load connecting conductor projecting through an opening in the chassis.

A load connection conductor insulator 65 as illustrated in FIGS. 6 and 7 may be positioned around the load connecting conductor 20. The load connection conductor insulator 65 may be an insulation sleeve. The insulation sleeve may be made of a plastic. In an aspect of the disclosure, the plastic may be thermoplastic such as polybutylene. The material is not limited to the polybutylene and other thermoplastics may be used such as polycarbonate.

A portion of the load connection conductor insulator 65 is within the chassis and a portion is exposed from the chassis. The load connection conductor insulator 65 electrically isolates the load connecting conductor 20 from the chassis 60. The load connection conductor insulator 65 also thermally insulates the chassis from the load connecting conductor 20. The sleeve also has a skirt surrounding the opening. The skirt acts as a seal, which prevents moisture from entering the chassis 60. The skirt may be secured to the chassis 60 via openings in the skirt and mounting hardware (not shown in FIG. 7).

As shown in FIGS. 6 and 7, the output terminal(s) 70 of the switching unit may be connected to the terminal-side conductor 5 on the bottom (the terminal connection hardware is not shown in FIGS. 6 and 7. However, in other aspects, the terminal(s) 70 may be connected on the top.

In an aspect of the disclosure, depending on the proximity of other circuitry within the inverter module, exposed surfaces of the AC busbar may be covered with insulation as needed to electrically isolate the AC busbar from the other circuitry as well as for thermal isolation.

In some aspects of the disclosure, the cross-sections (cross-sectional areas) of the different conductors may be different, e.g., the terminal-side conductor 5, the load-side conductor 10, the two connecting conductors 15. As described above, the cross-section of the two connecting conductors 15 may be based on the size of the opening in the sensors 50, current flowing, material (skin depth). For example, the two connecting conductors 15 may have a cross-section of about 19 mm×13 mm, for example, the cross-section may be 19 mm×12.7 mm. However, the cross-section is not limited to this example and if other sensors are used, the cross-section may be different. The cross-sectional area of the connecting conductors 15 may also be based on the relationships shown in FIGS. 3A-3D.

The cross-sectional area of the terminal-side conductor 5 may be based on the size of the terminals 70, current flowing, and material (skin depth). The cross-sectional area of the terminal-side conductor 5 may also be based on the relationships shown in FIGS. 3A-3D. The cross-sectional area of the terminal-side conductor 5 may also be based on the size of the chassis 60 and the number of other components in the inverter module. In an aspect of the disclosure, the terminal-side conductor 5 has a cross-sectional area of about 13 mm×13 mm, for example, the cross-section may be 13.0 mm×12.7 mm. However, the cross-section is not limited to this example.

The cross-section area of the load-side conductor 10 may be based on the current flowing, and material (skin depth), the weight of the load connecting conductor 20, and the size of the notch. The cross-sectional area of the load-side conductor 10 may also be based on the relationships shown in FIGS. 3A-3D. In an aspect of the disclosure, the load-side conductor 10 has a cross-sectional area of about 10 mm×13 mm, for example, the cross-section may be 10.2 mm×12.7 mm.

The cross-section area of the load connecting conductor 20 may be based on the current flowing and material (skin depth).

The current flowing in the AC busbar may be application specific. In some aspects of the disclosure, the total current may be greater than 800 A. The current flows in the load connecting conductor 20. Based on the current balancing described herein, about half may flow in each connecting conductor 15 and share substantially even amongst the connected terminals 70. In other aspects, the total current may be greater than 900 A or 1000 A depending on the electric machine and application.

Current at each terminal 70 may be sensed by directly connecting a known inductance to the terminals and measuring a voltage or current. The sensed current may be used to determine the distance y.

In an aspect of the disclosure, the distance y may be about 27 mm and about 36 mm for the busbar illustrated in FIG. 5. For example, the distance may be 25 mm or 40 mm. In an aspect of the disclosure, the distance y may be 29 mm.

The inductance of the respect paths, e.g., between a connection point for the terminal 70 (e.g., u, v, w) and the common point at the middle of the load-side conductor may be measured using a LCR meter with the leads positioned at the respective point.

As illustrated in FIG. 8, the length of the load-side conductor 10 may be L. A center line CL on the load-side conductor 10 is L/2 (half-way between ends in the x-direction). The center line CL is illustrated in FIG. 8 by a dotted and dashed line. The load-side conductor 10 has a width of W_a, where the center in the width direction is W_a/2. FIG. 8 also illustrates a line going through the center of the width (W_a/2). The common point may intersect the two center lines. For example, the common point is identified in FIG. 8 by an X. For inductance measurement, one lead of the LCR meter may be positioned on the common point (X).

The connection point for the respective phase terminal may be defined as illustrated in FIG. 8. The terminal-side conductor 5 has a width of W_b. A center line in the width direction is the width W_b/2. The center line is illustrated in FIG. 8. Each phase terminal, e.g., u, v, w is separated by a distance d. The connection point for phase v is illustrated by an X, which is the intersection of the centerline CL and the centerline W_b/2. The connection point coincides with the terminal connection openings 25. In some aspects of the disclosure, the connection point will be the center point of the mounting hardware for the terminals since the mounting hardware electrically connects the terminals (e.g., phase u, phase v and phase w) to the AC busbar and thus defines the electrical node. The connection points for phase u/phase w are illustrated in FIG. 8 by +, which is the intersection of a line offset by d from the centerline CL and the centerline (width) W_b/2.

For measurement, one of the leads may be positioned on the connection points for the respective phase terminals (e.g., the surface of the mounting hardware) while the other lead is on the common point as described above.

In an aspect of the disclosure, the inductance of the path between the u/w connection points and the common point may be less than 25 nH, such as about 20 nH. In an aspect of the disclosure, the inductance of the path between the v connection point and the common point may be less than 23 nH, such as about 18 nH. The average inductance may be about 19.5 nH. For a three-phase case, two of the three phases may have an inductance greater than the average and one of the phases may have an inductance less than the average. For example, the difference between the average and the inductance of two phases may be about 7% and the difference between the average and the inductance of one phase may be about −3%. The difference between any phase terminal (inductance from the connection point of a respective phase terminal and the common point) and the average (of inductance of all of the phase terminals to the common point) may be less about 10%.

The example of the inductances is for descriptive purposes only and the inductance may be application specific for the system.

In aspect of the disclosure, the current balance between the u, v, w when connected to a load, e.g., an electric machine may be less than about 5% for a frequency of about 1000 kHz. This is the nominal frequency of the current induced in the windings of the electric machine. The AC busbar may also be ripple current causes by the switching frequency of the semiconductor switches. For example, the switching frequency may higher than 10 kHz. The ripple current is more sensitive to imbalance of the current sharing. While the amplitude of the ripple current may be less, the difference in the current sharing as a percentage is greater a higher frequency.

In the discussion and claims herein, the term "about" indicates that the value listed may be somewhat altered, as long as the alteration does not result in nonconformance of the process or device. For example, for some elements the term "about" can refer to a variation of ±0.1% for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

For purposes of the description hereinafter, the terms "upper", "lower", "right", "left", "vertical", "horizontal", "top", "bottom", and derivatives thereof shall relate to a device relative to a floor and/or as it is oriented in the figures or with respect to a surface.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. An AC busbar configured to connect at least three phases from a semiconductor switching unit to a load, each phase having an AC terminal, wherein the at least three phases are connected in parallel by the AC busbar, the AC busbar comprising:

a terminal-side conductor mechanically connectable to each AC terminal of the semiconductor switching unit;
a load-side conductor positioned between the terminal-side conductor and the load, the load-side conductor being parallel to the terminal-side conductor;
two connecting conductors, configured and dimensioned to be surrounded by a current sensor, and connecting the terminal-side conductor and the load-side conductor; and
a conductor orthogonally projecting from the load-side conductor, the orthogonally projecting conductor configured to be connected with the load, the orthogonally projecting conductor is centered on the load-side conductor, wherein a distance between the terminal-side conductor and the load-side conductor is such that a difference in an inductance between a connection point for a respective AC terminal of each phase and a common point on a middle of the load-side conductor is less than a predetermined percentage with respect to an average of the respective inductances.

2. The AC busbar of claim 1, wherein the predetermined percentage is about 10%.

3. The AC busbar of claim 1, wherein the terminal-side conductor, the load-side conductor and the two connecting conductors form a rectangular shape.

4. The AC busbar of claim 1, wherein each connecting conductor is configured for substantially a same current.

5. The AC busbar of claim 1, wherein a cross-sectional area of each connecting conductor is configured for at least 450 A.

6. The AC busbar of claim 1, wherein there are three-phases and three AC terminals, one per phase and wherein the terminal-side conductor has three corresponding openings to mount the AC busbar to the three AC terminals.

7. The AC busbar of claim 6, wherein a distance AC current travels from a connection point for the central terminal of the three-phases along the AC busbar to the common point is asymmetric with a distance AC current travels from the connection point for the end terminals of the three-phases of the semiconductor switching unit to the common point.

8. The AC busbar of claim 6, wherein the orthogonally projecting conductor is aligned with the connection point for the central terminal of the three-phases.

9. The AC busbar of claim 1, wherein the orthogonally projecting conductor is configured and dimensioned for a current of at least 900 A.

10. The AC busbar of claim 1, wherein the distance between the terminal-side conductor and the load-side conductor is greater than about 25 mm and less than about 40 mm.

11. The AC busbar of claim 1, wherein the terminal-side conductor, the two connecting conductors, the load-side conductor and the conductor orthogonally projecting from the load-side conductor are continuous and formed from a single conductor.

12. The AC busbar of claim 1, wherein the terminal-side conductor and the two connecting conductors are formed from a single conductor.

13. The AC busbar of claim 1, wherein an inductance difference between the respective connection points and the common point is less than about 2 nH.

14. The AC busbar of claim 13, wherein a current difference between the terminals is less than about 5% for a current of about 1000 Hz.

15. An AC busbar configured to connect at least three phases from a semiconductor switching unit to a load, each phase having an AC terminal, wherein the at least three phases are connected in parallel by the AC busbar, the AC busbar comprising:
- a terminal-side conductor mechanically connectable to each AC terminal of the semiconductor switching unit;
- a load-side conductor positioned between the terminal-side conductor and the load;
- two connecting conductors, configured and dimensioned to be surrounded by a current sensor, and connecting the terminal-side conductor and the load-side conductor; and
- a conductor orthogonally projecting from the load-side conductor, the orthogonally projecting conductor configured to be connected with the load, the orthogonally projecting conductor is centered on the load-side conductor, wherein a distance between the terminal-side conductor and the load-side conductor is such that a difference in an inductance between a connection point for a respective AC terminal of each phase and a common point on a middle of the load-side conductor is less than a predetermined percentage with respect to an average of the respective inductances.

* * * * *